(12) United States Patent
Cha (10) Patent No.: US 9,706,243 B2
(45) Date of Patent: *Jul. 11, 2017

(54) BROADCASTING RECEIVER AND A METHOD OF DETERMINING AN OPERATION MODE OF BROADCASTING RECEIVER

(71) Applicant: LG Electronics Inc., Seoul (KR)

(72) Inventor: Sang Hoon Cha, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,397

(22) Filed: Jun. 12, 2015

(65) Prior Publication Data

US 2015/0281759 A1 Oct. 1, 2015

Related U.S. Application Data (63) Continuation of application No. 13/960,385, filed on Aug. 6, 2013, now Pat. No. 9,083,991, which is a
(Continued)

(30) Foreign Application Priority Data

Jul. 31, 2007 (KR) .................. 10-2007-0076883

(51) Int. Cl.
*H04N 21/418* (2011.01)
*H04N 21/61* (2011.01)
(Continued)

(52) U.S. Cl.
CPC ..... *H04N 21/4183* (2013.01); *H04L 12/2801* (2013.01); *H04N 7/1675* (2013.01);
(Continued)

(58) Field of Classification Search
CPC .............. H04L 12/2801; H04N 21/236; H04N 21/4181; H04N 21/4183; H04N 21/4353;
(Continued)

(56) References Cited

U.S. PATENT DOCUMENTS 6,839,072 B2  1/2005 Trajkovic et al.
7,796,599 B2 * 9/2010 Jung ..................... H04L 1/0083
370/392
(Continued)

FOREIGN PATENT DOCUMENTS

CN  1901382  1/2007
CN  1972401  5/2007
(Continued)

OTHER PUBLICATIONS

SCTE, Host-Pod Interface Standard, ANSI/SCTE 28 2001, SCTE, all.*

*Primary Examiner* — Rong Le
(74) *Attorney, Agent, or Firm* — Dentons US LLP (57) ABSTRACT

A broadcasting receiver and a method of determining an operation mode of broadcasting receiver are disclosed. A host device transmits the resource information including A-mode resource information. And a POD receives the resource information and determining an operation mode based on the received resource information and operation mode setting information. The broadcasting receiver can protect content data received from all the transfer protocols including the wired/wireless network and the IP protocol, using the conditional access provided from the conventional cable card. The broadcasting receiver determines whether the host supports the A-mode and determines a method for receiving broadcast data, such that the operation mode of the broadcasting receiver can be properly established according to the determined result.

2 Claims, 6 Drawing Sheets

Related U.S. Application Data continuation of application No. 12/219,853, filed on Jul. 29, 2008, now Pat. No. 8,528,030.

(51) Int. Cl.

| | |
|---|---|
| *H04N 21/435* | (2011.01) |
| *H04L 12/28* | (2006.01) |
| *H04N 7/167* | (2011.01) |
| *H04N 21/436* | (2011.01) |
| *H04N 21/4367* | (2011.01) |
| *H04N 21/4623* | (2011.01) |
| *H04N 21/6402* | (2011.01) |
| *H04N 21/654* | (2011.01) |
| *H04N 21/236* | (2011.01) |

(52) U.S. Cl.
CPC ....... *H04N 21/236* (2013.01); *H04N 21/4181* (2013.01); *H04N 21/4353* (2013.01); *H04N 21/4367* (2013.01); *H04N 21/43607* (2013.01); *H04N 21/4623* (2013.01); *H04N 21/6125* (2013.01); *H04N 21/6402* (2013.01); *H04N 21/654* (2013.01)

(58) Field of Classification Search
CPC ......... H04N 21/43607; H04N 21/4367; H04N 21/4623; H04N 21/6125; H04N 21/6402; H04N 21/654; H04N 7/1675
See application file for complete search history.

(56) References Cited

U.S. PATENT DOCUMENTS

| | | |
|---|---|---|
| 2004/0133920 A1 | 7/2004 | Kim et al. |
| 2005/0155069 A1* | 7/2005 | LaJoie ............... H04N 21/2402 725/80 |
| 2006/0133429 A1 | 6/2006 | Seo et al. |
| 2006/0168664 A1 | 7/2006 | Frank et al. |
| 2007/0006252 A1 | 1/2007 | Yun |
| 2008/0028432 A1 | 1/2008 | Hong et al. |
| 2008/0095366 A1 | 4/2008 | Taniguchi |
| 2008/0159279 A1* | 7/2008 | Younis ............. H04N 21/23608 370/389 |
| 2010/0083337 A1* | 4/2010 | Williams ............. H04N 7/1675 725/132 |

FOREIGN PATENT DOCUMENTS

| | | |
|---|---|---|
| EP | 1748645 | 1/2007 |
| EP | 1784019 | 5/2007 |
| KR | 1020070012130 | 1/2007 |
| KR | 1020070050241 | 5/2007 |

\* cited by examiner

| Syntax | No. of Bits | Mnemonic |
|---|---|---|
| inquire_DSG_mode() {<br>    inquire_DSG_mode_tag<br>    length_field()<br>} | 24 | uimsbf |

FIG. 5

| Syntax | No. of Bits | Mnemonic |
|---|---|---|
| set_DSG_mode() {<br>  set_DSG_mode_tag<br>length_field()<br>operational_mode<br>if ((operational_mode==basic_DSG_mode) \|\|<br>       (operational_mode==basic_DSG_one-way_mode)) {<br>    number_MAC_addresses<br>    for (i=0; i<number_MAC_addresses; i++) {<br>        DSG_MAC_address<br>    }<br>    remove_header_bytes<br>  }<br>} | 24<br><br>8<br><br><br>8<br><br>48<br><br>16 | uimsbf<br><br>uimsbf<br><br><br>uimsbf<br><br>uimsbf<br><br>uimsbf |

BROADCASTING RECEIVER AND A METHOD OF DETERMINING AN OPERATION MODE OF BROADCASTING RECEIVER

This application is a continuation of U.S. patent application Ser. No. 13/960,386, filed Aug. 6, 2013, which is a continuation of U.S. application Ser. No. 12/219,853, filed on Jul. 29, 2008, which claims the priority to and benefit of Korean Patent Application No. 10-2007-76883, filed on Jul. 31, 2007, all of which are incorporated by reference for all purposes as if fully set forth herein.

BACKGROUND OF THE INVENTION

Field of the Invention

The present invention relates to a broadcast receiver and a method for determining an operation mode of the broadcast receiver, and more particularly to a broadcast receiver for processing broadcast data IP-based Tx broadcast data and a method for determining an operation mode of the broadcast receiver.

Discussion of the Related Art

Existing television (TV) services have been provided in such a manner that contents produced by broadcasting companies are transmitted through radio transmission media, such as terrestrial waves, cables or satellites, and a viewer watches the transmitted contents through a TV receiver capable of receiving the transmitted contents via the respective transmission media.

However, as digital TV technologies based on digital broadcasting are developed and are commercially available, breaking from existing analog broadcasting, various contents, such as real-time broadcasts, Contents on Demand (CoD), games and news, can be provided to a viewer using the Internet network connected to each home, besides the existing transmission media.

An example of the provision of contents using the Internet network may include an Internet Protocol TV (IPTV). The IPTV indicates a broadcast receiver for receiving various types of information services, moving-image contents and broadcasts using an Internet network and displaying them to a user. The Internet network can be implemented on the basis of various types of networks such as optical cable networks, coaxial cable networks, fiber-to-the-home (FTTH), telephone networks and wireless networks.

The service using the Internet network additionally has bidirectionality and enables a viewer to watch a desired program at his/her convenient time, unlike general terrestrial broadcasting.

SUMMARY OF THE INVENTION

Accordingly, the present invention is directed to a broadcast receiver and a method for determining an operation mode of the broadcast receiver that substantially obviate one or more problems due to limitations and disadvantages of the related art.

An object of the present invention is to provide an IP-based broadcast receiver for protecting transmission (Tx) contents using a conditional access provided from a conventional cable card, and a method for determining an operation mode of the broadcast receiver.

Another object of the present invention is to provide a broadcast receiver which receives a network capability owned by a host at a security card in order to process broadcast data received on all the transfer protocols including the IP protocol, and determines an optimum operation mode, and a method for determining an operation mode of the broadcast receiver.

Another object of the present invention is to provide a broadcast receiver capable of receiving broadcast data from a Multimedia over Coax Alliance (MoCA), and a method for determining an operation mode of the broadcast receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of determining an operation mode of a broadcasting receiver includes opening a resource manager session between a host device and a point of deployment (POD), transmitting resource information whether the host device supports A-mode from the host device to the POD, and determining an operation mode based on the transmitted resource information. Herein a method of determining an operation mode further includes transmitting the request of setting an operation mode from the host device to the POD.

Also, a method of determining an operation mode further includes transmitting the determined operation mode to the host device. Herein the step of transmitting the determined operation mode includes inserting the determined operation mode in a DSG mode setting message, and transmitting the DSG mode setting message to the host device.

Also, a method of determining an operation mode further includes transmitting a Mac address to the host device when the determined operation mode is A-mode, and obtaining an Internet Protocol(IP) address allocated to the Mac address from a server and transmitting the IP address to the POD. Herein the step of transmitting a Mac address includes inserting the Mac address in a flow creation request message, and transmitting the flow creation message to the host device to the POD. And the step of obtaining IP address allocated to the Mac address includes obtaining the IP address from server, inserting the IP address in a flow creation acknowledgment message, and transmitting the flow creation acknowledgment message to the POD.

Also, the resource manager session may be an extended channel support resource session. And the resource manager session may be a DSG resource session. And the A-mode means that the host device receives broadcast data based on Internet Protocol(IP) through a network. Herein the host device includes an IP physical interface unit for supporting A-mode and the IP physical interface unit receives an Ethernet frame including broadcast data.

In another aspect of the present invention, a method of determining an operation mode of a broadcasting receiver includes receiving resource information indicating whether a host device supports A-mode from the host device, and determining an operation mode based on the transmitted resource information and operation mode setting information. Herein, a method of determining an operation mode further includes receiving the request of setting an operation mode from the host device. And a method of determining an operation mode further includes transmitting the determined operation mode to the host device.

Also a method of determining an operation mode further includes transmitting a Mac address to the host device when the determined operation mode is an A-mode, and receiving an IP address allocated to The Mac address from host device.

Also, the operation mode setting information is any of information received from a headend, information saved in memory and information setted by default. Herein when there is no the information received from headend, the operation mode setting information is the information saved in memory and when there is no the information saved in memory, the operation mode setting information is the information setted by default.

In another aspect of the present invention, a method of setting an operation mode of a broadcasting receiver includes receiving operation mode information from a POD, receiving a Mac address from the POD when the operation mode information indicates that an operation mode is an A-mode, and obtaining an IP address allocated the Mac address from a server and transmitting the IP address to the POD. Herein a method of setting an operation mode further includes obtaining a host device IP address from server when the operation mode information indicates that an operation mode is an A-mode. Also, the operation mode information is received with being included in a DSG mode setting message.

Also, the step of obtaining an IP address allocated to the Mac address includes obtaining the IP address from the server, including the IP address in a flow creation acknowledgment message, and transmitting the flow creation acknowledgment message to the POD.

In another aspect of the present invention, a broadcasting receiver includes a host device for transmitting the resource information indicating whether the host device supports A-mode, and a point of deployment(POD) for receiving the resource information and determining an operation mode based on the received resource information and operation mode setting information. Herein, the host device transmits the request of setting an operation mode to the POD. And the POD transmits the determined operation mode to the host device.

Also, the POD transmits a Mac address to the host device when the determined operation mode is an A-mode, and the host device receives the Mac address, obtains an IP address allocated to the Mac address from a server and transmits the IP address to the POD.

Also, the operation mode setting information is any of information received from headend, information saved in memory and information setted by default.

Therefore, the present invention can perform content protection using the conditional access provided from the conventional cable card. Therefore, the service provider or the service enterpriser can perform the above content protection, and can stably charges a usage fee to a service user using the conditional access.

The present invention processes broadcast data received from all the transfer protocols including both the wired/wireless network and the IP protocol, such that it interfaces with the openCable card. A service subscriber or a service user minimally changes or extends a function of the conventional cable card, such that the subscriber or user is able to view data of a desired service provider.

The present invention supports an operation mode in which broadcast data received on all the transfer protocols including the wired/wireless network and the IP protocol is configured in the form of an IP packet and the resultant broadcast data of the IP packet format is transmitted to the card. As a result, the IP broadcast data can be more effectively and stably processed.

Based on network capability information owned by the host and Tx information transmitted from the broadcast station, the present invention determines an operation mode of the broadcast receiver, and sets an operation mode of the broadcast receiver to the determined operation mode, such that the appropriate operation mode of the broadcast receiver can be determined according to the host and the method for receiving the broadcast data.

Since the present invention supports the conventional operation mode, it can acquire a backward compatibility.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A broadcast receiver and a method of processing broadcast data according to the present invention will be described in detail with reference to the accompanying drawings.

An Internet protocol TV (IPTV) system which is an example of a system capable of providing various types of contents using an Internet network may be largely divided into a server, a network and a broadcast receiver (client).

The server of the IPTV system may include servers having various functions, such as a service discovery and selection server, a streaming server, a content guide information server, a customer information server, and a payment information server.

Among these servers, the streaming server transmits stored Moving Picture Experts Group (MPEG)-2 or MPEG-4 encoding moving-image data to the broadcast receiver via a network. As a transmission protocol, a real-time transport protocol (RTP) or a RTP control protocol (RTCP) may be used.

In the case where a real-time streaming protocol (RTSP) is used, the reproduction of a moving-image stream can be controlled by a network trick play function such as Pause, Replay, Stop or the like to some extent.

The content guide information server provides information on provided various contents. The content guide information includes a variety of information on the contents as information corresponding to electronic program guide (EPG) information. The content guide information server stores content guide information data and provides the stored data to the broadcast receiver.

Among the servers, the service discovery and selection server provides access information of servers for providing various types of content services such as broadcasts, Contents on Demand (CoD) or games and reproduction information to the broadcast receiver.

A network system includes an Internet-based network and gateways. As the Internet-based network, various types of networks based on the IP, such as optical cable networks, coaxial cable networks, fiber-to-the-home (FTTH), telephone networks and wireless networks, may be used. The gateways may generally perform data delivery, multicast group management using a protocol such as an Internet Group Management Protocol (IGMP) and Quality of Service (QoS) management.

The IPTV indicates a broadcast receiver capable of receiving data transmitted via the Internet network and providing the data to a user. The broadcast receiver may include an IPTV settop, a homenet gateway and an IPTV embedded TV.

A hybrid IPTV system can provide various types of contents of the Internet as well as various types of existing broadcast contents. That is, besides various types of broadcast contents such as terrestrial broadcasting, cable broadcasting, satellite broadcasting or private broadcasting, various Internet image contents or data contents other than images can be provided to the user. These contents may be provided in real time or on demand.

Figure 1:
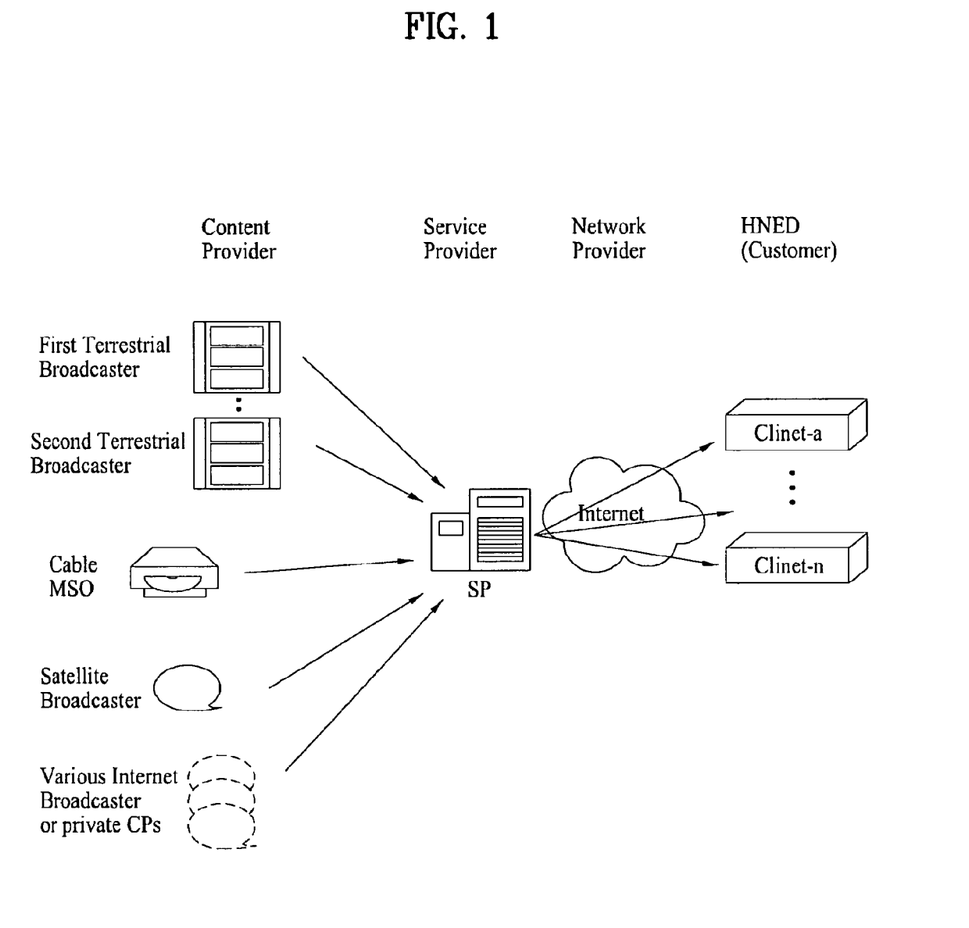
FIG. 1 is a conceptual diagram illustrating an IPTV system according to one embodiment of the present invention.

FIG. 1 is a schematic view showing an IPTV system according to an embodiment of the present invention.

From the viewpoint of a content service provider, the IPTV system may be divided into a content provider (CP), a service provider (SP), a network provider (NP) and a user.

The CP manufactures and provides various types of contents. The CP may include a terrestrial broadcaster, a cable system operator (SO) or a cable multiple system operator (MSO), a satellite broadcaster and an Internet broadcaster.

The SP packages contents provided by the CP to a service and provides the service. For example, the SP of FIG. 1 packages a first terrestrial broadcast, a second terrestrial broadcast, a cable MSO broadcast, a satellite broadcast, various Internet broadcasts to the service and provides the service to the user.

As means for protecting the contents transmitted in the IPTV system, conditional access or content protection may be used. As an example of the conditional access or the content protection, a cable card or a downloadable conditional access system (DCAS) may be used.

The use of the security card or the DCAS is selected by the SP for providing the IPTV service. In the case where the security card or the DCAS is used in the broadcast receiver, the SP communicating with the broadcast receiver should use that system.

Figure 2:
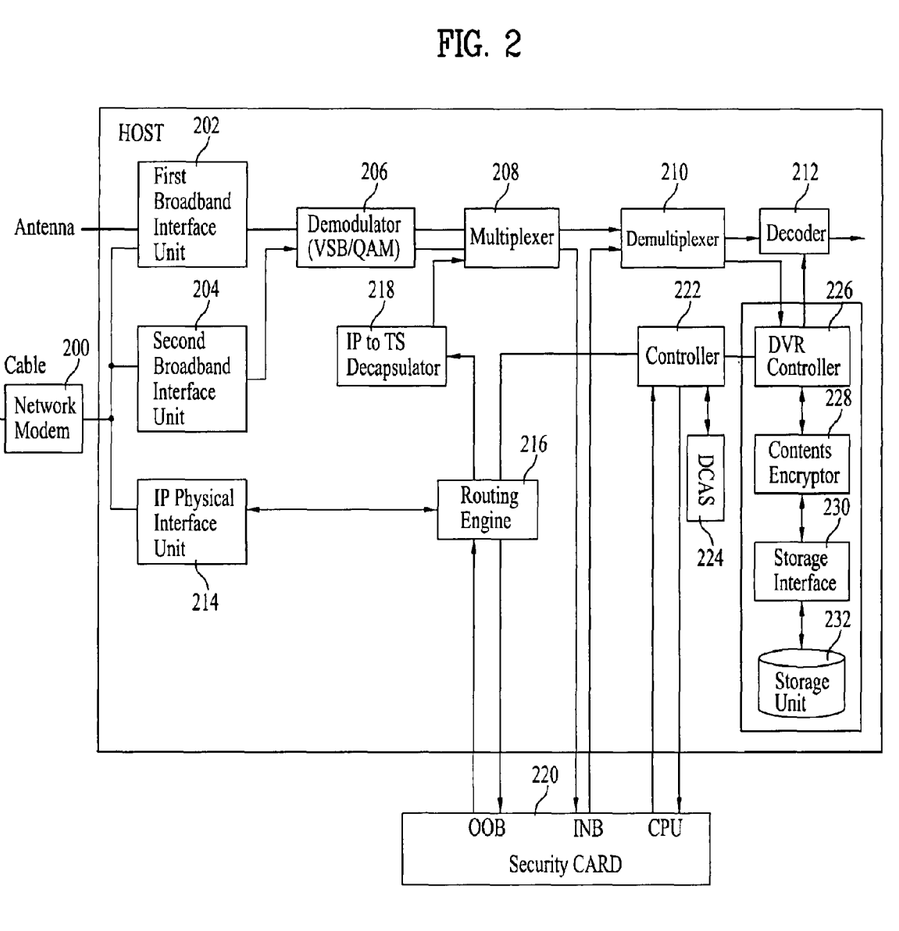
FIG. 2 is a block diagram illustrating a receiver of a security card according to one embodiment of the present invention.

FIG. 2 is a schematic block diagram showing a broadcast receiver using the security card according to an embodiment of the present invention.

The broadcast receiver of FIG. 2 can receive all of an IPTV service based on the IP, a cable broadcast, a terrestrial broadcast and a satellite broadcast. The broadcast receiver of FIG. 2 may receive only the IPTV service or cable broadcasting according to the implementation examples. The security card of FIG. 2 may be called other terms according to the implementation examples.

The broadcast receiver of FIG. 2 is largely divided into a host device and a security card. The host device includes a first broadband interface unit 202, a second broadband interface unit 204, a demodulator 206, a multiplexer 208, a demultiplexer 210, a decoder 212, an IP physical interface unit 214, a routing engine 216, an IP to transport packet (TP) decapsulator 218, a controller 222, a downloadable CAS (DCAS) 224, a digital video recorder (DVR) controller 226, a content encryptor 228, a storage interface 230, and a storage unit 232. The security card 220 may be a single stream card capable of processing only one stream and a multi stream card capable of simultaneously processing plurality of streams. For example, the security card 220 may be implemented by a cable card or a smart card.

The broadcast receiver is an open cable type receiver in which the security card including a conditional access system (CAS) can be detached from a main body. The security card is also called a point of deployment (POD) module, which is inserted into or detached from a slot of the main body of the broadcast receiver. The main body into which the security card is inserted is also called a host device. That is, a combination of the security card and the host device is called the broadcast receiver.

The host device included in the broadcast receiver of FIG. 2 is one example implemented by a multi stream host device capable of simultaneously processing a plurality of streams. When a host device is implemented by a single stream host device capable of processing only one stream, it is bypassed for multiplexer 208 and the demultiplexer 210 of the host device of FIG. 2 to generate a CableCard MPEG Packet (CMP) by appending a Packet Header to a MPEG transport packet and multiplex the CMP and demultiplex the multiplexed CMP. But, though a host device is implemented a single stream host device, the other operations that the present invention disclose are performed identically.

A network modem 200 connects an external network and the broadcast receiver. For example, the broadcast receiver may be connected to the external network using a data over cable service interface specification (DOCSIS) modem, a wireless repeater connected to a wireless Internet network, or a wired repeater connected to a wired Internet network, such as a wired Asymmetric Digital Subscriber Line (ADSL) repeater. The example of the connection between the broadcast receiver and the external network is only exemplary and may vary depending on how the broadcast receiver is connected to the external network.

Figure 3:
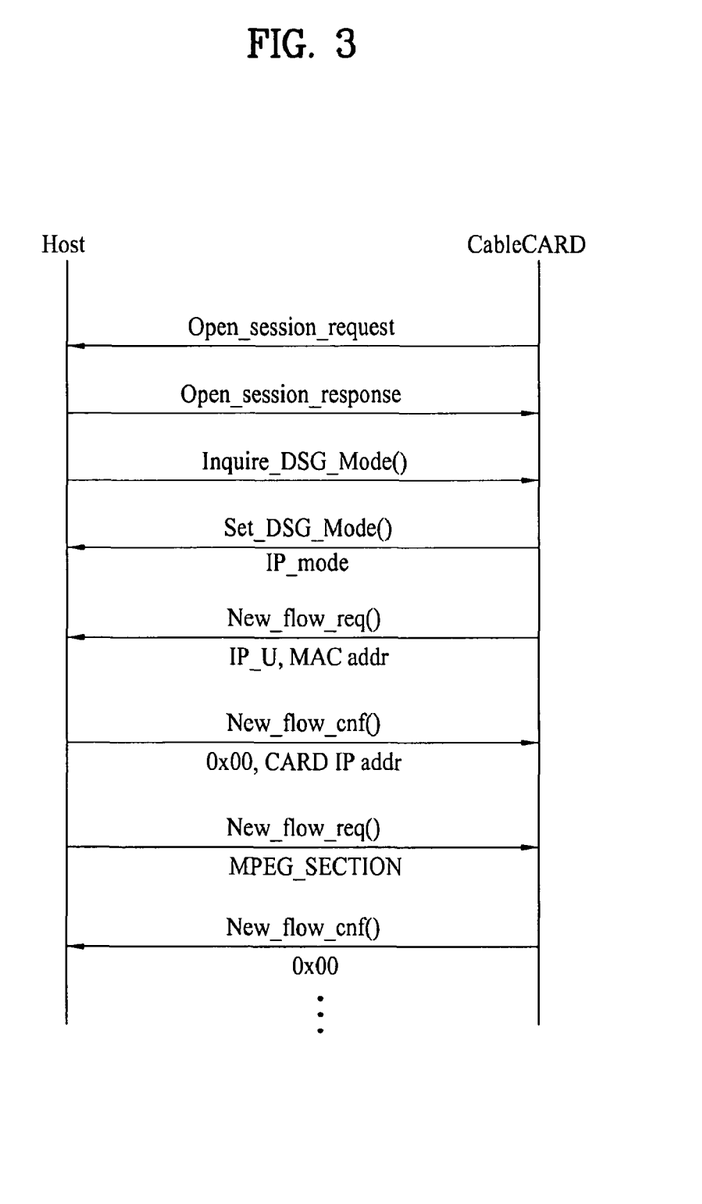
FIG. 3 is a flow chart illustrating a process for transmitting an operation mode according to one embodiment of the present invention.

FIG. 3 is a view showing the connection between the broadcast receiver and the external network using the DOCSIS modem according to the present invention.

In the case where the network modem 200 is implemented by the DOCSIS modem, the broadcast receiver according to the present invention may be connected to a DOCSIS network. That is, the network modem 200 may build a cable modem termination system (CMTS) (DSG agent) and a DSG tunnel for delivering a data broadcast received from a settop controller (DSG server) via the DOCSIS network and receive broadcast data via the built DSG tunnel. Here, the DOCSIS network may be implemented by an IP backbone network and support IP multicast/unicast.

However, in order to support the IP multicast/unicast via the DOCSIS network, a packet received from the CMTS (DSG agent) should be transformed to a DSG packet and the DSC packet should be transmitted. Accordingly, the broadcast receiver cannot be directly connected to the external IP network so as to receive the broadcast data.

In order to solve these problems, the network modem 200 may provide a function for directly connecting the broadcast receiver to the external IP network. For example, the network modem 200 may be implemented by a Multimedia over Coax Alliance (MoCA). In the case where the network modem 200 is implemented by the MoCA, the IP-based network may be established and connected over a coaxial cable network. That is, in the case where the network modem 200 is implemented by the MoCA, the DOCSIS may not be used, the DOCSIS modem does not need to be used, and the CMTS connected to the DOCSIS modem over the network does not need to be used. In addition, the DSG tunnel established between the DOCSIS modem and the CMTS does not need to be used. Accordingly, since seamless IP-based connectivity may be implemented over the coaxial network, the broadcast receiver according to the present invention can use IP over Coax and thus provide a rapid stable broadcast service to the user.

The first broadband interface unit 202 tunes to only a specific channel frequency of terrestrial audio/video (A/V) broadcasting transmitted via an antenna or cable A/V broadcasting transmitted in-band via a cable connected to the network modem 200, and outputs the tuned signal to the demodulator 206.

At this time, since the terrestrial broadcast and the cable broadcast are transmitted by different transmission methods, they are demodulated by different demodulation methods in the demodulator 206. For example, while the terrestrial A/V broadcast is modulated by a vestigial sideband modulation (VSB) method, the cable A/V broadcast is modulated by a quadrature amplitude modulation (QAM) method. Therefore, if the channel frequency tuned by the first broadband interface unit 202 is the terrestrial broadcast, the demodulator 206 demodulates the terrestrial broadcast by the VSB method and if the channel frequency tuned by the first broadband interface unit 202 is the cable broadcast, demodulates the cable broadcast by the QAM method.

The second broadband interface unit 204 tunes to only a specific channel frequency of cable A/V broadcast transmitted in-band via the cable connected to the network modem 200, and outputs the tuned signal to the demodulator 206.

The first broadband interface unit 202 and the second broadband interface unit 204 may tune the signals of different channels and transmit the signals to the demodulator 206. Alternatively, the first broadband interface unit 202 and the second broadband interface unit 204 may tune different A/V streams of the same channel and transmit the signals to the demodulator 206. For example, the first broadband interface unit 202 may tune a stream of a main picture and the second broadband interface unit 204 may tune a stream of a picture in picture (PIP). In the case where a digital video signal is stored in a digital video recorder (DVR), the video signal may be watched and recorded using the first broadband interface unit 202 and the second broadband interface unit 204.

The demodulator 206 demodulates the received signal and transmits the demodulated signal to the multiplexer 208. The multiplexer 208 may multiplex the signals output from the demodulator 206 and the IP to TP decapsulator 218 and output the multiplexed signal. For example, the main video signal which is tuned by the first broadband interface unit 202 and is demodulated and the PIP video signal which is tuned by the second broadband interface unit 204 and is demodulated are multiplexed and the multiplexed signal is output. The video signals of different channels may be multiplexed, or the demodulated signal and the signal output from the IP to TP decapsulator 218 may be multiplexed, according to the implementation examples.

If the signal output from the multiplexer 208 is terrestrial broadcast data, the signal is output to the demultiplexer 210 and, if the signal output from the demultiplexer 208 is the cable broadcast data or the IPTV broadcast data, the signal is output to the demultiplexer 210 via the security card 220 mounted in the slot. The security card 220 includes the CAS in order to prevent higher value-added broadcasting contents from being copied and permit conditional access, which is also called the POS module.

That is, if the received broadcast data is scrambled, the security card 220 descrambles the broadcast data and outputs the descrambled data to the demultiplexer 210. If the security card 220 is not mounted, the A/V broadcast data output from the multiplexer 208 is directly output to the demultiplexer 210. In this case, the scrambled A/V broadcast data cannot be descrambled and thus cannot be normally watched.

The demultiplexer 210 routes the A/V broadcast data output from the multiplexer 208 and the A/V broadcast data output from the security card 220 to be output to the decoder 212 or the DVR controller 226. The decoder 212 restores the compressed A/V signal to an original signal via a video/audio decoding algorithm and outputs the restored signal.

The DVR controller 226, the content encryptor 228, the storage interface 230 and the storage unit 232 serve to store the received digital data or reproduce the stored data. The DVR controller 226 controls MPEG TS routed by the demultiplexer 210 to be stored or controls video data, audio data and system data selected from stored data to be reproduced, under the control of the controller 222. The content encryptor 228 encrypts data to be stored and outputs the encrypted data or decrypts the encrypted data and outputs the decrypted data. The encryptor 228 may not be used according to the implementation examples.

The storage interface 230 performs data input/output interface with the storage unit 232, and the storage unit 232 stores the received data.

The DCAS 224 may download and store the CASs from a transmission server and perform a CAS function according to a proper CAS of the stored CASs. The controller 222 controls data processing of the host device and the interface between the host device and the security card.

The Ethernet NIC 214 receives an Ethernet frame packet destined for a specific IP address in a signal received through the network modem 200, and transmits the received Ethernet frame packet to the routing engine 216. The Ethernet NIC 214 may also receive data for two-way communication (for example, a paid program request, receiver status information, user input, etc.) from the routing engine 216 and then transmit the received data to an external network through the network modem 200. The specific IP address may be an IP address of the host device or an IP address of the security card. Here, the method in which the Ethernet NIC 214 receives an Ethernet frame through the network modem 200 and transmits the received Ethernet frame to the routing engine 216 and the routing engine 216 then routes the received packet to a destination of the packet using a TCP/IP network stack will now be referred to as an "IP mode". The Ethernet NIC 214 and the routing engine 216 correspond to IP-mode resources that support the IP mode.

In the broadcast receiver of FIG. 2, IPTV broadcast data according to the IP protocol, a Video On Demand (VOD) signal or an Out Of Band (OOB) message signal may be received via the IP physical interface unit 214. In the existing cable broadcast, an OOB message such as System Information (SI), an Emergency Alert System (EAS), an eXtended Application Information Table (XAIT), CAS information, or a variety of card control information is received using a DOCSIS Settop gateway (DSG) method or an OOB method.

In the broadcast receiver of FIG. 2, the DOCSIS modem or the OOB tuner may be included in the host device such that the OOB message is received. For example, the OOB message may be received using one of the IP method and the OOB method or using one of the IP method, the DSG method and the OOB method.

In the case where the OOB message is received using one of the IP method and the OOB method, the broadcast receiver of FIG. 2 further requires an OOB tuner or demodulator. In the case where the OOB message is received using one of the IP method, the DSG method and the OOB method, the broadcast receiver of FIG. 2 further requires the DOCSIS modem, the OOB tuner, a switching unit for selecting one of the DSG method and the OOB method, and a demodulator for transmitting the data to the headend according to the method.

In the case where all the IP method, the DSG method and the OOB method can be used or in the case where both the IP method and the OOB method can be used except for the DSG method, the transmitter selects one of the above-described methods and transmits information on the selected method to the security card 220. The security card 220 informs the host device of the operating method according to the information on the method selected by the transmitter. In this case, backward compatibility can be solved.

In the broadcast receiver of FIG. 2, for convenience of description, the case where the OOB message is received via the IP physical interface unit 214 using the IP, instead of the DSG method using the DOCSIS modem or the OOB method using the OOB tuner, will be described. In this case, the transmitter should packetize the OOB message using the IP and transmit the OOB message. In the VOD or IPTV broadcast, the message such as the CAS information may be received in the form of a packet such as a VOD packet or an IPTV broadcast packet.

The OOB message is only exemplary, and other necessary information may be added or unnecessary information of the above-described information may be excluded according to the implementation examples.

The routing engine 216 routes the received packet to a destination of the packet using a TCP/IP protocol-based network stack. The TCP/IP network 216 supports both a TCP/IP protocol and a user datagram protocol (UDP)/IP protocol.

The routing engine 216 routes the received VOD signal or the IPTV broadcast data to the IP to TP decapsulator 218. The IP to TP decapsulator 218 parses the received MPEG or MPEG-2 TS packet and outputs the parsed packet to the multiplexer 208. The process after the multiplexer 208 is described above. Since the MPEG-2 broadcast data is used in the above example, the TP packet is received and parsed. However, in the case where the broadcast data using other standard is received, other units may be used instead of the TP packet unit. Accordingly, the scope of the present invention is not limited to the terms used in the implementation examples.

The routing engine 216 transmits the packet, of which the destination is the security card 220, to the security card 220. The OOB message which is one of the packets of which the destination is the security card 220 is routed by the routing engine 216 and transmitted to the security card 220. In the case where the OOB message is routed to the security card 220, the data can be transmitted to the security card 220 using a second layer routing method, a third layer routing method, or a fourth layer routing method.

If the second layer routing method is used, the message is routed using a media access control (MAC) address system of the destination included in the header of the received Ethernet frame. If the third layer routing method is used, the message is routed using an IP address system of the destination included in the IP header of the received Ethernet frame. The use of the second layer routing method or the third layer routing method may vary according to implementation examples. If the fourth layer routing method is used, the message is routed using a port number included in the UDP header of the received Ethernet frame. If the received Ethernet frame includes the TCP header, the message is routed using a port number included in the TCP header of the received Ethernet frame. The use of the second layer routing method, the third layer routing method or the fourth layer routing method may vary according to implementation examples. That is, the second layer routing method, the third layer routing method or the fourth layer routing method may be used according to implementation examples.

A data channel, an extended channel and an in-band channel exist between the security card and the host device. The data channel is set such that a control signal is exchanged between the host device and the security card, and the extended channel is set such that actual data is exchanged. The data channel and the extended channel are CPU interfaces which are defined such that data is exchanged between the host device and the security card.

That is, the security card communicates with a transmitter, analyzes a command received from the transmitter, and performs an operation instructed by the transmitter while communicating with the host device via the data channel and the extended channel or sends contents input by the user to the transmitter.

At this time, in order to transmit the data via the extended channel, first, a transmission line corresponding to the data type defined between the security card and the host device should be set. This is called a flow. For example, in order to transmit MPEG section data, an MPEG section flow is set between the security card and the host device and then the MPEG section data is actually transmitted via the flow. The extended channel may include a DSG flow, an IP flow and an MPEG section flow. Only, if eCM(embeded Cable Modem) like DOCSIS Modem is not used in the host device, the DSG flow is not used in the flows. Herein the IP flow may include at least one of an IP unicast (IP_U) flow and an IP muticast (IP_M) flow.

The in-band channel is set between the host device and the security card in order to transmit an MPEG-2 transport packet containing audio, video and data and corresponds to an MPEG interface or an in-band MPEG-TS interface. The MPEG data flow is set as the transmission line for transmitting the data via the in-band channel.

Before the communication operating mode of the host device as described above is set or before the host device exchanges an OOB message or the like with the security card, the host device needs to provide the security card with information of network operating modes supported by the host device. Accordingly, while the interface between the host device and the security card is initialized, for example when the host device boots or when the security card is inserted into the host device, the host device transmits the information of network operating modes supported by the host device to the security card. In this case, the operation mode of the host may include an A-mode and operations modes (i.e., an OOB-down mode, an OOB-up mode, and a DOCSIS mode) of the conventional broadcast receiver.

In this case, the A-mode is indicative of a network operation mode based on the IP physical interface unit 214. A representative example of the A-mode is the IP scheme of FIG. 2.

The OOB-down mode is indicative of a network operation mode based on a forward data channel (FDC). The OOB-up mode is indicative of a network operation mode based on a reverse data channel (RDC). The DOCSIS mode is indicative of a nework operation mode based on a Docsis Cable Modem.

The host can transmit information for supporting network operation mode to the security card using a resource manager (RM) protocol. In other words, the host transmits the list of identifiers of all resources of the host to the security card using the RM protocol. The security card may acquire the host's conditional access system (CAS) information and the host's resource information (e.g., network operation mode support information) using the above protocol. Based on the above information, a control- or communication-function is performed between the host and the security card. The resource information transmission/reception operation based on the RM protocol is performed at the beginning of an application stack from among the interface initialization process between the host and the security card.

The security card receives the network operation mode support information from the host, and receives the operation mode information from the headend or the service provider, such that it determines a network operation mode using the received operation mode. The security card may transmit the determined network operation mode to the above host, or may directly request the flow generation of the determined network operation mode from the host.

The resource information transmission/reception according to the RM protocol may be performed at the beginning of the application stack from among the interface initialization process between the host and the security card.

FIG. 3 is a flow chart illustrating a process for transmitting an operation mode according to one embodiment of the present invention. Namely, FIG. 3 shows the message flow a message between the host and the security card.

Referring to FIG. 3, the security card requests the host to open the RM protocol session, such that it transmits the message 'Open_session_request' to the host. Upon receiving the message 'Open_session_request' from the security card, the host opens the session to answer the message, as denoted by 'open_session_response'. The above session may be a session of an extended channel support resource or a session of a DSG resource. For example, if the version of the extended channel support resource is 4 or less, the session of the extended channel support resource is used. If the version of the extended channel support resource is 5 or more, the session of the DSG resource is used.

If the above-mentioned open is open, the host transmits the message 'Inquire_DSG_Mode( ) Application Data Unit (APDU)' for requesting information of a preferred operation mode to the security card.

Figure 4:
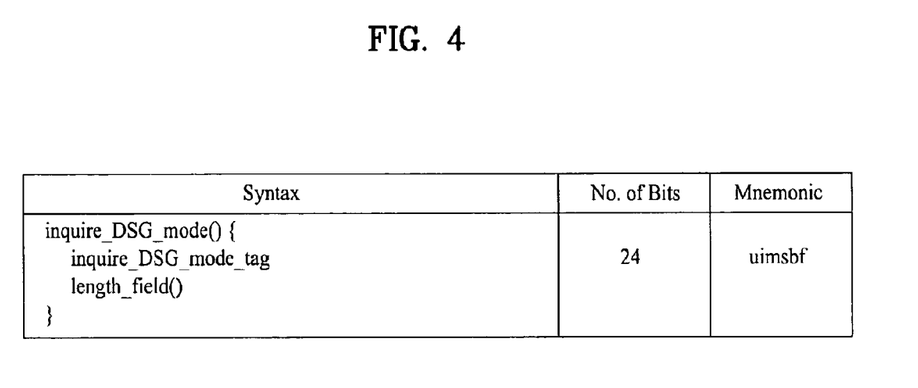
FIG. 4 shows a syntax of 'Inquire_DSG_Mode( ) APDU' according to one embodiment of the present invention.

FIG. 4 shows a syntax of 'Inquire_DSG_Mode( ) APDU' according to one embodiment of the present invention. For the convenience of description and better understanding of the present invention, English terms of individual constituent fields of the syntax will hereinafter be used without any change, and the individual fields will be enclosed with double quotation marks.

A field denoted by "profile_reply_tag" is a 24-bit field, and has an identification value for recognizing that the above-mentioned APDU is equal to 'profile_reply( ) APDU'. For example, the above-mentioned identification value may be '0x9F8E06'. A field denoted by "length_field( )" includes field size information in units of a byte.

The security card transmits the message 'set_DSG_Mode( ) APDU' to the host. The security card includes information of a preferred operation mode in the 'set_DSG_Mode( ) APDU' message, and transmits the resultant 'set_ DSG_ Mode( ) APDU' message to the host. The 'set_DSG_Mode( ) APDU' message may be transmitted as a response to the 'Inquire_DSG_Mode( )APDU' message to the host. Although there is no request, the 'set_DSG_Mode( ) APDU' message may also be transmitted to the host after the resource session has been established.

In this case, upon receiving network operation mode support information from the host, the security card includes the preferred operation mode information in the 'set_DSG_Mode( ) APDU' message, and transmits the resultant message to the host. In other words, upon receiving the preferred operation mode information from the host, the host determines the preferred operation mode, includes the determined preferred operation mode information in the 'set_DSG_Mode( ) APDU' message, and directly transmits the resultant message to the host.

Figure 5:
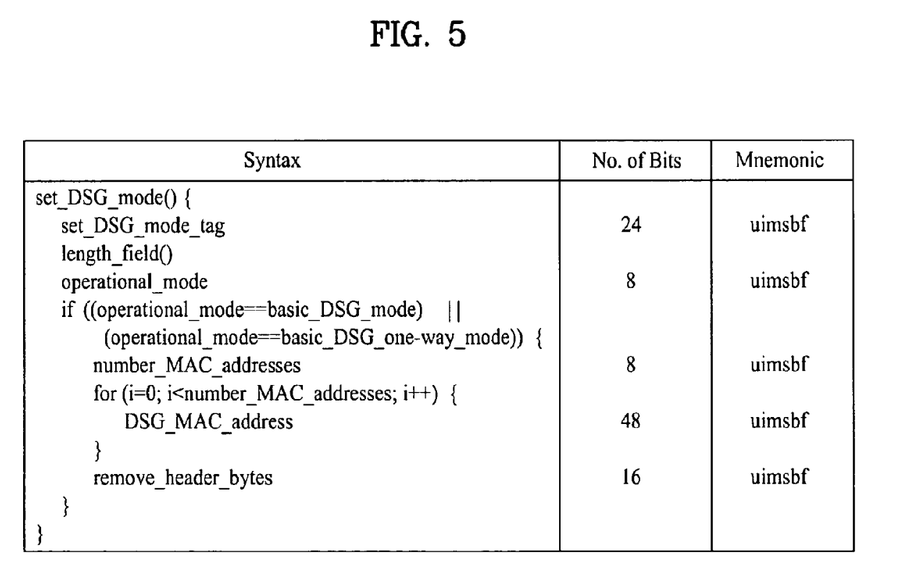
FIG. 5 shows a syntax of 'set_DSG_Mode( ) APDU' according to one embodiment of the present invention.

FIG. 5 shows a syntax of 'set_DSG_Mode( ) APDU' according to one embodiment of the present invention.

A field denoted by "set_DSG_Mode_tag" is a 24-bit field, and has an identification value for recognizing that the above-mentioned APDU is equal to 'set_DSG_Mode( ) APDU'. For example, the above-mentioned identification value may be '0x9F8E07'. A field denoted by "length_field( )" includes field size information in units of a byte.

A field denoted by "operation_ mode" includes either information of the preferred operation mode or information of a network operation mode to be established by the host. Identification information of the operation mode of the above-mentioned "operation_mode" field is shown in the following table 1:

TABLE 1

| Operational mode | Value |
|---|---|
| SCTE55 mode (Legacy OOB mode) | 0x00 |
| basic DSG mode | 0x01 |
| basic DSG mode one-way mode | 0x02 |
| advanced DSG mode | 0x03 |
| advanced DSG mode one-way mode | 0x04 |
| IP mode | 0x05 |

If the preferred operation mode is the IP mode, the "operation_mode" field of the "set_DSG_Mode( ) APDU"

message has the value of '0x05'. The above-mentioned IP mode is indicative of a specific mode capable of transmitting/receiving data using the Ethernet NIC according to the Internet protocol. The scope or spirit of the present invention is not limited to only the above terms, but the IP mode can also be implemented with other modes as necessary.

If the operation mode of the "operation_mode" field is a DSG mode or a DSG one-way mode, the APDU includes the "number_MAC_addresses" field, the "DSG_MAC_address" field, and the "remove_header_bytes" field.

The "number_ MAC_ addresses" field includes specific information indicating the number of MAC addresses allocated by the card provider. The "DSG_ MAC_ address" field is repeated by 'for loop' fields as many as the number of MAC addresses. The "DSG_MAC_address" field includes information of an Ethernet MAC address. The "remove_header_bytes" field includes specific information indicating the number of bytes removed from a DSG tunnel packet before data is transmitted via the extended channel.

Upon receiving the 'set_DSG_Mode( ) APDU' message, the host performs parsing of the above APDu, and extracts the 'operational_mode' value. If the 'operational_mode' value is set to '0x05' (i.e., IP mode), the host begins to establish the networking operation based on the Ethernet NIC.

The host transmits a host MAC address allocated to each host to the DHCP server using a Dynamic Host device Configuration Protocol (DHCP), and acquires the IP address of the host.

The security card transmits the 'New_flow_req APDU' message to the host, and requests generation of the IP unicast (IP_U) flow. The 'service_type' field value of the 'New_flow_req( ) APDU' message is set to '0x01(IP_U)', and requests generations of the IP unicast flow. The 'New_flow_req APDU' message can transmit request information for requesting the IP unicast flow generation and the MAC address information of the security card. In this case, the security card does not transmit the 'set_DSG_Mode( ) APDU' message to the host, but transmits the 'New_flow_req( ) APDU' message for requesting the flow generation of the determined preferred operation mode to the host.

The host performs parsing of the 'New_flow_req( ) APDU' message, transmits the MAC address of the security card to the DHCP server, and acquires an IP address of the security card. The host includes both the IP address of the above-mentioned security card and grant information for granting the IP unicast flow generation in the 'New_flow_cnf( ) APDU' message, and transmits the resultant 'New_flow_cnf( ) APDU' message to the security card.

If the 'New_flow_cnf( ) APDU' message is received in the security card, the IP unicast flow is generated from the host and the extended channel of the security card. The security card can receive a variety of OOB messages via the above-mentioned flow, and can perform bi-directional IP communication.

The host transmits the 'New_flow_req( ) APDU' message to the cable security card, and requests the MPEG section flow from the security card. The security card transmits the 'New_flow_cnf( ) APDU' message to the host, such that it may allow the MPEG section flow. The host sets the 'Service_type' field value of the 'New_flow_req( ) APDU' message to '0x00 (MPEG_section)', such that it requests generation of the MPEG section flow. However, the order of the above-mentioned request and generation of the MPEG section flow has been disclosed for only illustrative purposes, and may also be set to another as necessary. For example, according to some implementation examples, the above-mentioned MPEG section flow may be performed before the IP unicast flow request or generation has occurred. For another example, the above-mentioned MPEG section flow may also be performed after the session has been open.

The APDU associated with the DSG mode includes 'Inquire_DSG_mode( )', 'set_DSG_mode( )', 'DSG_error( )', 'DSG_message( )', 'DSG_directory( )', 'send_DSG_info( )', etc. If the preferred operation mode is set to the IP mode, 'DSG_error( )', 'DSG_message( )', 'DSG_directory( )', and 'send_DSG_info(0)' other than 'Inquire_DSG_mode( )' and 'set_DSG_mode( )' are not used. If the unused APDU is received, the above-mentioned factors are discarded.

Figure 6A:
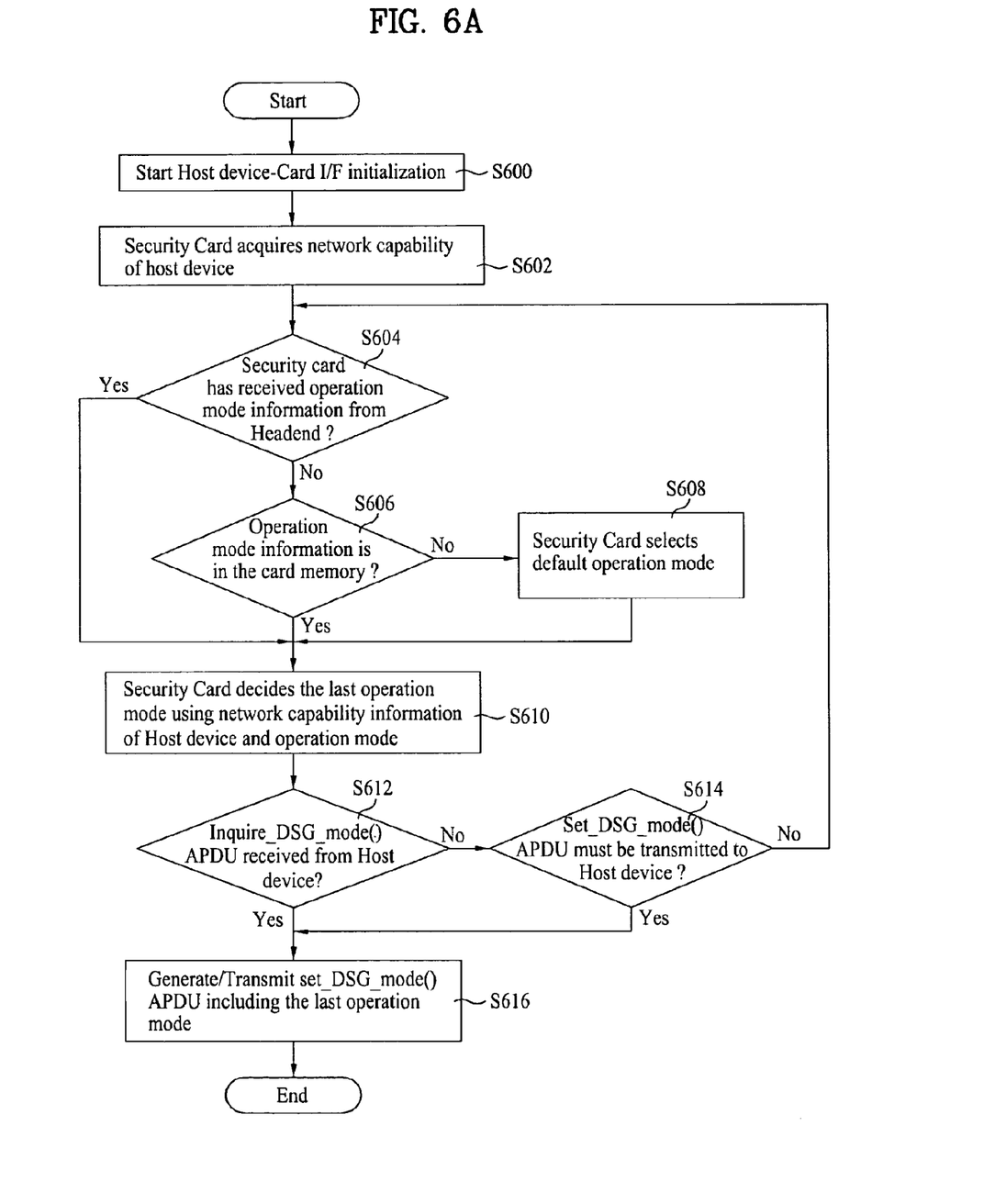
FIGS. 6A and 6B are flow charts illustrating processes for transmitting/receiving operation mode information according to one embodiment of the present invention.
Figure 6B:
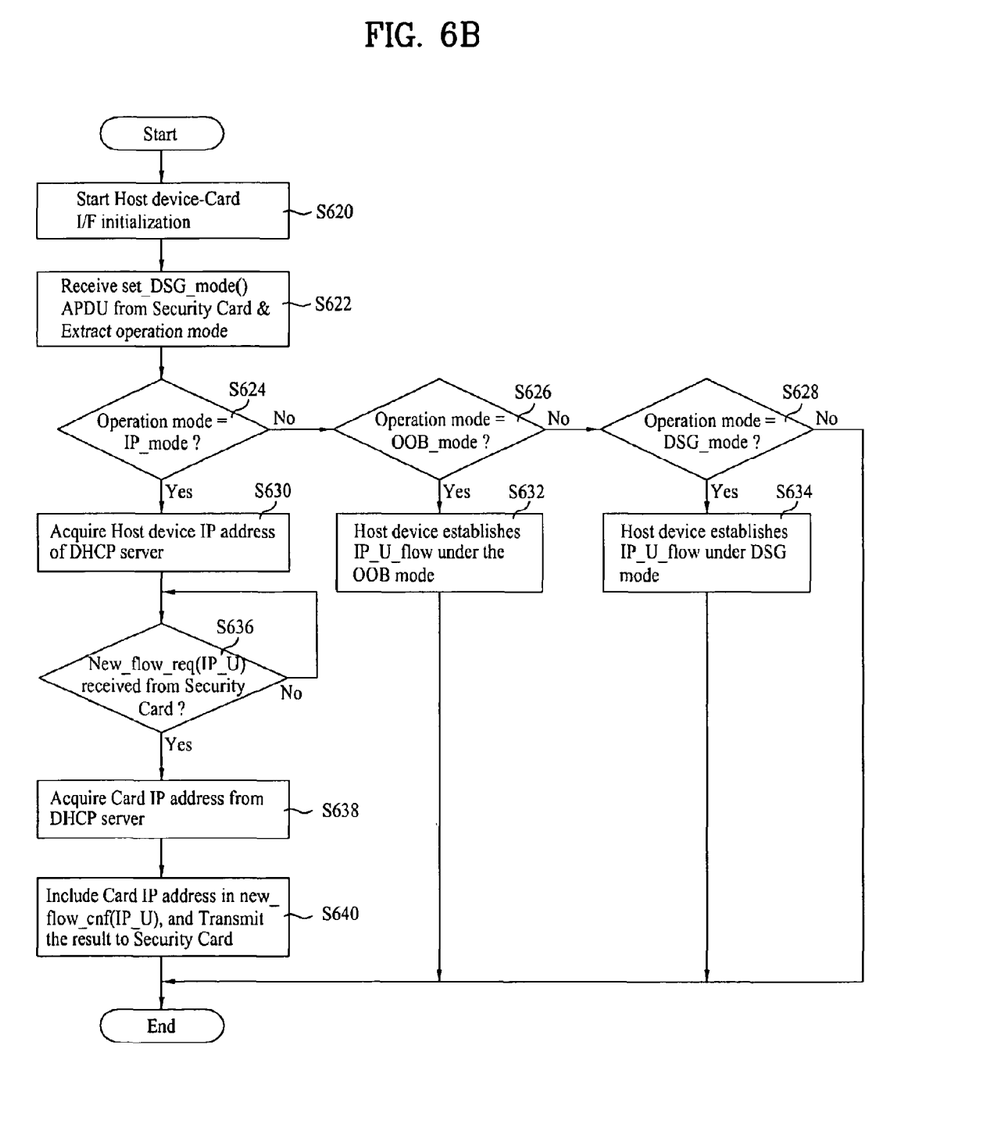

FIGS. 6A and 6B are flow charts illustrating processes for transmitting/receiving operation mode information according to one embodiment of the present invention. FIG. 6A is a flow chart illustrating a method for transmitting operation mode information from the security card to the host.

Referring to FIG. 6A, the interface (I/F) between the host and the security card is initialized at step S600. This interface initialization between the host and the security card may occur when the host is booted or the security card is inserted in the host.

If the interface between the host and the security card is initialized, the security card acquires network capability information capable of being supported by the host at step S602. The network capability information supportable by the host can be transmitted or received via the resource manage (RM) protocol.

The security card determines the preferred operation mode to transmit information of the preferred operation mode to the host.

The preferred operation mode information may be received from the headend or the service provider. According to implementation examples, the security card may store the preferred operation mode therein. In order to effectively cope with an unexpected case (e.g., the case in which the security card receives or stores no preferred operation mode information), a default operation mode may be established in the security card.

Therefore, the security card determines whether the preferred operation mode information has been received from the headend or the service provider at step S604. If the preferred operation mode information is not received in the security card, the security card determines the presence or absence of the stored preferred operation mode information at step S606. If the security card receives or stores no preferred operation mode information, the default operation mode is selected at step S608.

The security card determines the preferred operation mode to be transmitted to the host using both the operation mode information acquired from the above step S604, S606, or S608 and the network capability information supportable by the host at step S610. The preferred operation mode may be determined to be any one of the network capability modes supportable by the host.

The security card can transmit information of the determined preferred operation mode to the host. For example, the security card and the host can transmit or receive the preferred operation mode information using the extended channel support resource session or the DSG resource session.

The security card determines whether it has received the 'Inquire_DSG_mode( ) APDU' message from the host at step S612 or determines that it must transmit the 'set_DSG_mode( ) APDU' message to the host at step S614, includes the determined preferred operation mode information in the 'set_DSG_mode( ) APDU' message, and transmits the resultant 'set_DSG_mode( ) APDU' message to the host at step S616. The 'set_DSG_mode( ) APDU' message may be transmitted as a response to the 'Inquire_DSG_Mode( ) APDU' message to the host. Although there is no request, the above 'set_DSG_Mode( ) APDU' message can also be transmitted to the host after the resource session has been established. In other words, if the security card receives the network capability information supportable by the host from the host, the above-mentioned 'set_DSG_Mode( ) APDU' message can be immediately transmitted.

FIG. 6B is a flow chart illustrating a method for receiving/processing operation mode information by the host according to the present invention.

Referring to FIG. 6B, the interface (I/F) between the host and the security card is initialized at step S620. This interface initialization between the host and the security card may occur when the host is booted or the security card is inserted in the host.

The interface between the host and the security card is initialized, and at the same time the host extracts the preferred operation mode information received from the security card at step S622. The preferred operation mode information may be contained in the 'Operation_mode' field of the 'set_DSG_mode( ) APDU' message, such that the resultant preferred operation mode information may be received. The host determines the extracted operation mode, and initializes the network according to the above operation mode.

The host determines whether the extracted operation mode is the IP mode at step S624, the OOB mode at step S626, or the DSG_mode at step S628. If the operation mode is the IP mode at step S624, the host begins to establish the networking operation based on the Ethernet NIC. The host transmits the MAC address to the host DHCP server using the DHCP protocol, and acquires the IP address of the host at step S630.

If the host receives the 'new_flow_req( ) APDU' message for requesting the generation of the IP unicast flow from the security card at step S636, it acquires the IP address of the security card from the DHCP server located at a remote site at step S638. If the MAC address of the security card is transmitted to the DHCP server, the IP address of the security card can be acquired from the DHCP server.

The host includes the IP address of the security card and the IP unicast flow generation grant information in the 'new_flow_cnf( ) APDU' message, and transmits the 'new_flow_cnf( ) APDU' message including both the IP address and the grant information to the security card at step S640.

If the extracted operation mode is an OOB mode or a DSG_mode, the setup process for the networking operation begins according to individual modes at steps S632 and S634. In the case of the OOB mode, the security card acts as a modem, such that it communicates with the headend or the service provider. In the case of the DSG_mode, the host eCM (embedded Cable Modem) acts as a modem, such that it communicates with the headend or the service provider. In the case of the DSG_mode, the IP unicast flow is established between the security card and the host eCM (embedded Cable Modem). In the case of the OOB mode, the IP unicast flow is established between the host and the SCTE (Society of Cable Telecommunications Engineers) 55 modem of the security card.

Although the above-mentioned example has transmitted the IP-mode setup information to the host using the 'set_DSG_mode( ) APDU' message, it should be noted that a new APDU may be additionally defined such that the above-mentioned IP-mode setup information may be transmitted as necessary.

According to this embodiment of the present invention, a descramble module is contained in the security card or the smart card. The card is detachably connected to the host. The Rx broadcast signal is descrambled by the descramble module of the card, and the descrambled result is provided to the user. However, according to some embodiments of the present invention, the host may include a descramble module without the card. The descramble module may be modified to be downloaded from a broadcast station or a service provider. In other words, the downloaded descramble module may be modified to be stored in a predetermined memory contained in the host. However, the above-mentioned structures have been disclosed for only illustrative purposes, and it should be noted that the above-mentioned structural difference does not limit the spirit or scope of the present invention and can also be implemented with other examples as necessary.

As apparent from the above description, the present invention can perform content protection using the conditional access provided from the conventional cable card. Therefore, the service provider or the service enterprise can perform the above content protection, and can stably charges a usage fee to a service user using the conditional access.

The present invention processes broadcast data received from all the transfer protocols including both the wired/wireless network and the IP protocol, such that it interfaces with the openCable security card. A service subscriber or a service user minimally changes or extends a function of the conventional cable security card, such that the subscriber or user is able to view data of a desired service provider.

The present invention supports an operation mode in which broadcast data received on all the transfer protocols including the wired/wireless network and the IP protocol is configured in the form of an IP packet and the resultant broadcast data of the IP packet format is transmitted to the card. As a result, the IP broadcast data can be more effectively and stably processed.

Based on network capability information owned by the host and Tx information transmitted from the broadcast station, the present invention determines an operation mode of the broadcast receiver, and sets an operation mode of the broadcast receiver to the determined operation mode, such that the appropriate operation mode of the broadcast receiver can be determined according to the host and the method for receiving the broadcast data.

Since the present invention supports the conventional operation mode, it can acquire a backward compatibility.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A broadcast receiver comprising:
a security card that transmits a request opening a session associated with a resource on a host device to the host device; and
the host device that transmits a response in response to the request of the security card,
wherein the security card transmits a first data unit requesting an internet protocol (IP) address of the security card to the host device, wherein the host device transmits a second data unit including the IP address of the security card to the security card in response to the first data unit, wherein the host device comprising:

an IP physical interface unit that receives an Ethernet frame including an IP packet which carries a first moving picture experts group (MPEG) transport stream (TS) packet through an IP network;

a broadband interface unit that receives a cable broadcast signal which carries a second MPEG TS packet through a cable network;

a demodulator that demodulates the cable broadcast signal using a quadrature amplitude modulation (QAM) method;

a routing engine that routes the IP packet based on destination information included in the Ethernet frame using a third layer (layer-3) routing method;

a decapsulator that extracts the first MPEG TS packet from the IP packet;

a multiplexer that generates a CableCARD MPEG Packets (CMP) by appending a packet header to the first MPEG TS packet and second MPEG TS packet, multiplexes the generated CMP and output the multiplexed CMP to the security card; and a descrambler that decrypts CMP encrypted by the security card and process the decrypted CMP for a demultiplexer.

2. A method of processing broadcast data in a broadcast receiver, the method comprising:

transmitting a request opening a session associated with a resource on a host device from a security card to the host device; and transmitting a response in response to the request of the security card from the host device to the security card, transmitting a first data unit requesting an internet protocol (IP) address of the security card from the security card to the host device, transmitting a second data unit including the IP address of the security card to the security card in response to the first data unit from the host device to the security card, receiving an Ethernet frame including an IP packet which carries a first moving picture experts group (MPEG) transport stream (TS) packet through an IP network;

receiving a cable broadcast signal which carries a second MPEG TS packet through a cable network;

demodulating the cable broadcast signal using a quadrature amplitude modulation (QAM) method;

routing the IP packet based on destination information included in the Ethernet frame using a third layer (layer-3) routing method;

extracting the first MPEG TS packet from the IP packet;

generating a CableCARD MPEG Packets (CMP) by appending a packet header to the first MPEG TS packet and second MPEG TS packet;

multiplexing the generated CMP and outputting the multiplexed CMP to the security card;

decrypting CMP encrypted by the security card and processing the decrypted CMP for demultiplexing; and demultiplexing the processed CMP and routing the separated CMP.

* * * * *